(12) United States Patent
Rantanen

(10) Patent No.: US 6,255,667 B1
(45) Date of Patent: Jul. 3, 2001

(54) METHOD AND DEVICE FOR READING OUT IN CURVED FORM THE IMAGE EXPOSED TO AN IMAGING PLATE

(75) Inventor: Matti Rantanen, Kirkkonummi (FI)

(73) Assignee: Orion Corporation, Espoo (FI)

(*) Notice: Subject to any disclaimer, the term of this patent is extended or adjusted under 35 U.S.C. 154(b) by 0 days.

(21) Appl. No.: 09/117,363
(22) PCT Filed: Jan. 30, 1997
(86) PCT No.: PCT/FI97/00050
§ 371 Date: Nov. 16, 1998
§ 102(e) Date: Nov. 16, 1998
(87) PCT Pub. No.: WO97/28486
PCT Pub. Date: Aug. 7, 1997

(30) Foreign Application Priority Data

Jan. 31, 1996 (FI) .......................................... 960451

(51) Int. Cl.$^7$ .................................................. G03B 42/08
(52) U.S. Cl. .......................................... 250/585; 250/586
(58) Field of Search ................... 250/585, 584, 250/586, 484.2, 484.4

(56) References Cited

U.S. PATENT DOCUMENTS

| | | |
|---|---|---|
| 1,391,019 | 9/1921 | Landsman . |
| 4,302,671 * | 11/1981 | Kato et al. ........................ 250/584 |
| 4,629,890 | 12/1986 | Goto et al. . |
| 4,742,225 | 5/1988 | Chan . |
| 4,743,759 | 5/1988 | Boutet . |
| 4,816,923 | 3/1989 | Saotome . |
| 4,827,129 | 5/1989 | Tressl et al. . |
| 4,829,180 | 5/1989 | Goto et al. . |
| 4,922,102 | 5/1990 | Katayama . |
| 5,003,570 | 3/1991 | Whiting . |
| 5,416,336 | 5/1995 | Koivulehto . |
| 5,635,728 | 6/1997 | Cantu et al. . |

FOREIGN PATENT DOCUMENTS

| | | |
|---|---|---|
| 0304060 | 2/1989 | (EP) . |
| 97494 | 12/1996 | (FI) . |

OTHER PUBLICATIONS

"PSP–Photosimulable Phosphor Dental Radiography", Hildebolt, Charles F. DDS, PhD., et al. PSP Dental Radiography, Jan. 09, 1996.

* cited by examiner

Primary Examiner—Georgia Epps
Assistant Examiner—Richard Hanig
(74) Attorney, Agent, or Firm—Banner & Witcoff, Ltd

(57) ABSTRACT

The invention relates to an apparatus and method for the read-out of a latent image recorded on a stimulable phosphor sheet (1) by, for example, X-ray radiation. The apparatus comprises: a drum member (8) having a cylindrical circumferential surface; rotation means (22) for rotating (R) the drum member around the axis (3); means for maintaining the phosphor sheet (1) of a flexible material in the shape of the circumferential surface; a light source (4) for aiming stimulating light (6) at the phosphor surface (2); a photodetector (7) for detecting the light emitted from the phosphor surface under the effect of stimulation; and members (21) for moving (M), relative to the phosphor sheet, the stimulating light beam and the photodetector in a direction parallel to the axis. The cylindrical circumferential surface (5) is made up of the concave inner surface of the cylinder cavity (15) of the drum member, and the said transfer members (21) extend to the inside of the cylinder cavity (15) in order to introduce a stimulating beam and to aim it at the concave phosphor surface (2) of the phosphor sheet and to collect in the photodetector the light emitted from the phosphor surface.

19 Claims, 4 Drawing Sheets

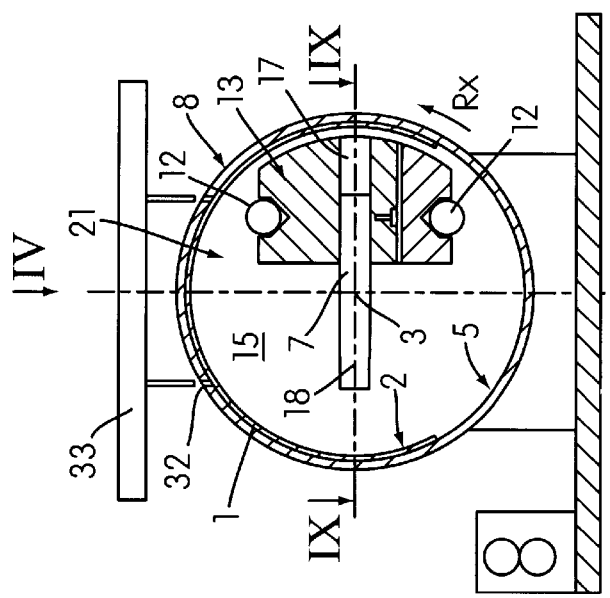
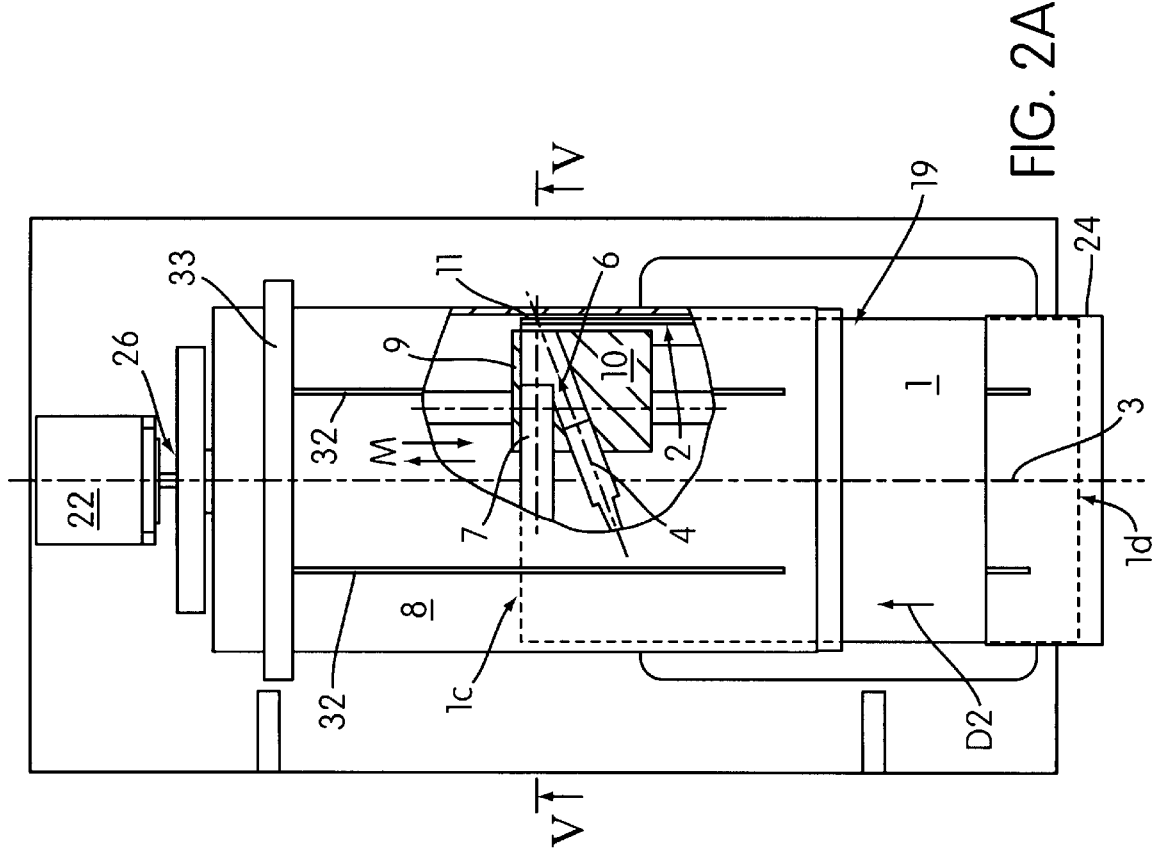
FIG. 2B
FIG. 2A

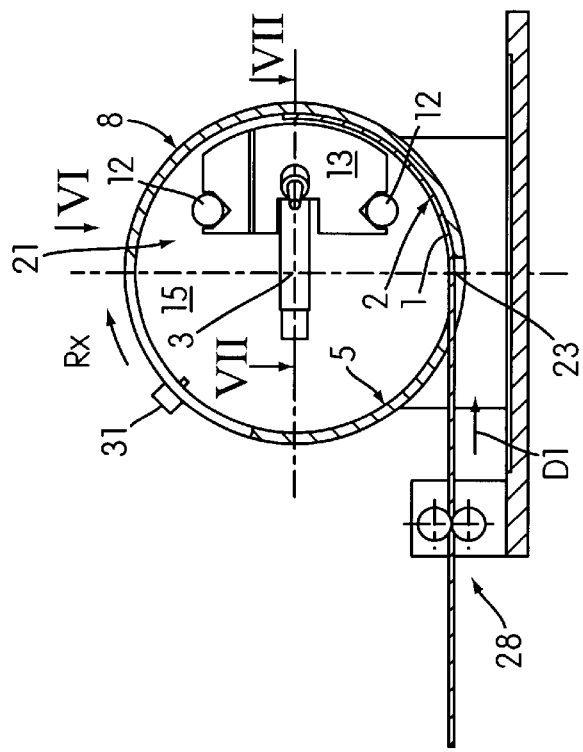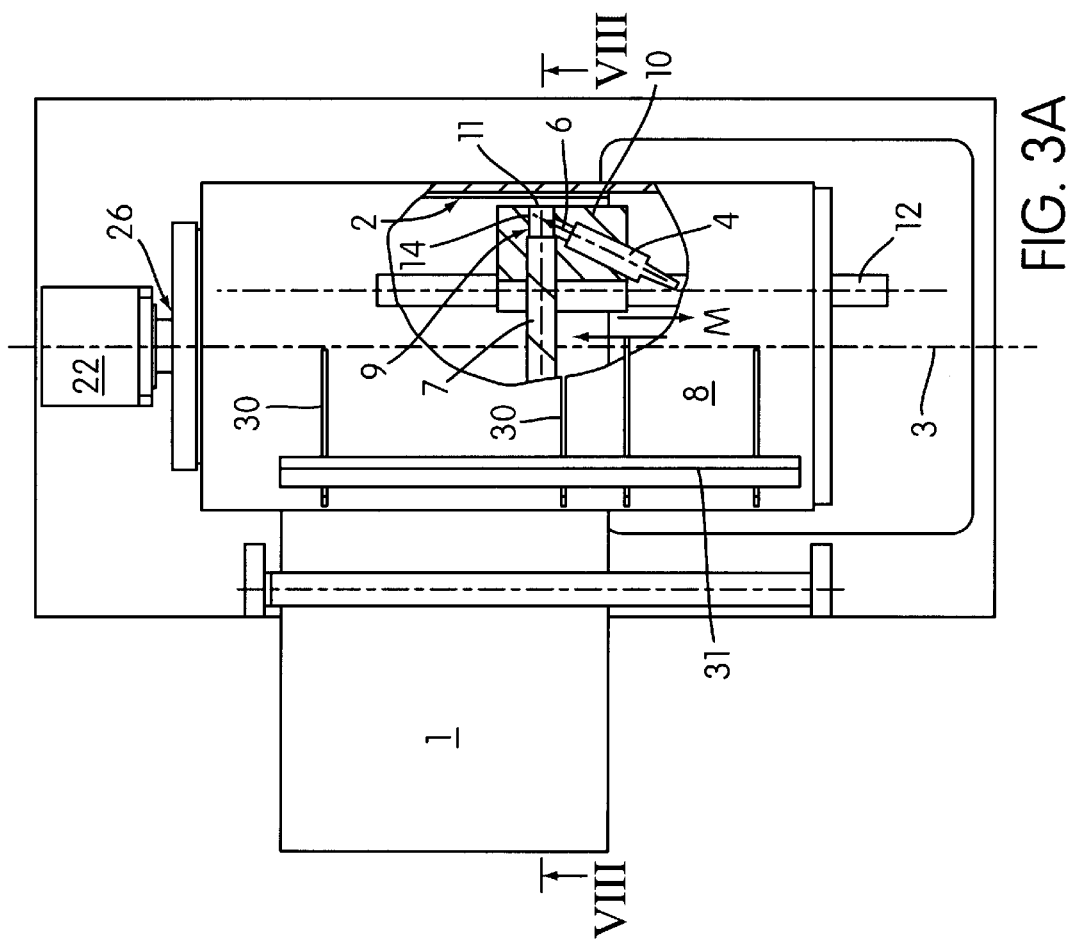
FIG. 3B
FIG. 3A

METHOD AND DEVICE FOR READING OUT IN CURVED FORM THE IMAGE EXPOSED TO AN IMAGING PLATE

The invention relates to a method for the read-out of a latent image recorded in a stimulable phosphor sheet by X-ray radiation or the like, in which method a separate phosphor sheet of a flexible material, which carries a latent image, is positioned in a curved shape along the circumference of a cylinder; this curved phosphor sheet is rotated around the axis of the cylinder circumference; a stimulating beam of light obtained from a source of light is aimed at the phosphor surface of the sheet carrying the latent image, the light emitted from the phosphor surface under the effect of this beam being directed to a photodetector; and the stimulating beam of light and the phosphor sheet are moved relative to each other in a direction parallel to the said axis for the read-out of the phosphor sheet. The invention also relates to an apparatus for the read-out of such a phosphor sheet while it is positioned in a curved shape.

Phosphor sheets in which a latent image is recorded by X-radiation are commonly used in radiography. After the exposure of the radiograph, this latent image is read out by aiming at the sheet, point by point, a stimulating beam of light under the effect of which there is produced an emission light activated by the latent image, and this emission in turn is detected by a detector and is converted into an electronic form for further processing. Numerous different read-out methods and read-out apparatuses have been proposed for the read-out of the latent image in such a phosphor sheet. For introducing the emitted light to a detector or detectors there is used, for example, a light collector, which is made up of an inwardly reflective tube extending over the entire width of the phosphor sheet, an inwardly reflective conical piece extending over the entire width of the phosphor sheet or an optical fiber bundle extending over the entire width of the phosphor sheet, which collector is moved in a direction parallel to the length of the phosphor sheet, this direction being perpendicular to the said width of the light collector. At the same time the stimulating beam of light is scanned along the whole width of the light collector, either through a slot in the tubular light collector or via a mirror surface positioned in a massive light collector based on fiber optics or in a similar manner on total reflection, the stimulating beam scanning the light collector from one end to the other. In this manner the entire phosphor plate is covered by the movement, the scanning traces forming a zig-zag pattern over the surface area of the phosphor sheet. In all of these described embodiments, the phosphor sheet is maintained flat during the read-out. Such methods and apparatuses suitable for the read-out of a phosphor sheet are described in publications U.S. Pat. No. 4,629,890, U.S. 4,742,225, U.S. 4,743,759 and U.S. 4,829,180. The apparatuses and methods of the type described above have a number of disadvantages. First, the manufacture of light collectors which extend over the entire width of the image is very complicated and expensive. The manufacture of the stimulating-beam scanning device inevitably associated with them requires top precision because it is at a distance from the phosphor plate, and also because it is necessary to know the mutual locations of each position of the turning light beam and the corresponding image point in the phosphor sheet, in order to avoid errors in the final image pattern. This part is thus also expensive. Since in such apparatuses the angle of incidence of the stimulating beam against the phosphor surface of the phosphor sheet varies, in which case the beam at the edge of the phosphor sheet is at a considerable angle as compared to being perpendicular to the phosphor sheet, this causes imprecision in the final read-out image, especially in the area of the edges of the image. In addition, in such large-sized light collectors, which are truly large as compared with the cross section of the stimulating beam and to the photosensitive area of the detector, the losses of light are very large, in which case there tends to be noise and other interference in the obtained signal.

Publication U.S. Pat. No. 4,922,102 describes a phosphor sheet read-out method in which the phosphor sheet is rotated in its plane while it is being read by means of a point-like reading head which is, between rotations, moved in a direction parallel to the rotational radius of the phosphor sheet, which remains flat. In this case the phosphor sheet is read one circular trace at a time, one inside another. Non-public patent application FI-950048 describes a phosphor sheet read-out method in which the phosphor sheet is moved in its plane in one direction while a read-out apparatus having a point-like reading head is rotated around an axis perpendicular to the plane of the phosphor sheet. In this case the phosphor sheet is read in successive curved traces. The rotating of the phosphor sheet in a plane and the use of a rotating reading head are relatively poor in the efficiency of their use of the read-out time, since for a considerable proportion of the total read-out time the reading beam is outside the rectangular surface area of the phosphor sheet. These structures presuppose of the rotating apparatus a precision which is difficult to implement in order that the distance between the reading head made up of a stimulating beam and a detector on the one hand and the phosphor sheet on the other should remain precisely the same at each point of the phosphor sheet.

Publication U.S. Pat. No. 5,416,336 describes an apparatus in which a stimulating beam is scanned in one direction on a mirror inside an emitted radiation collector, while the phosphor plate is being moved in another direction. By this arrangement, indeed a high read-out precision and low losses of light are achieved, but the apparatus is best suited for use for the read-out of relatively small-sized images.

Publication U.S. Pat. No. 4,829,180 also describes an arrangement in which the phosphor sheet is positioned on a cylinder with the phosphor surface outwards, and the phosphor sheet is read by means of a point-like reader which comprises a stimulating beam and a detector for emitted radiation. During the read-out the cylinder is rotated around its axis, whereby one scanning direction of the phosphor sheet is accomplished, whereas another scanning direction, parallel to the axis of the cylinder, is accomplished by moving either the reading head or the cylinder in a direction parallel to the rotation axis. This publication does not at all describe how the phosphor sheet is attached to the outer surface of the cylinder. Article Hildebolt, Vannier: "PSP-Photostimulable Phosphor Dental Radiography"—Washington University School of Medicine, St. Louis, Mo. describes a corresponding phosphor sheet read-out method, but it describes additionally that the backing of the phosphor sheet is made up of a thin metal sheet which adheres magnetically to the outer surface of the cylinder. The reliability of such magnetic adhesion is not very good, at least if the cylinder is rotated at even a moderate speed. In addition, the metal backing of the phosphor sheet renders it very rigid, in which case its shaping around the cylinder is uncertain and the risk of its becoming detached during the rotation of the cylinder further increases. Thus these described arrangements have the disadvantage of a high risk that the phosphor sheet becomes detached, and for this reason it is most likely necessary to maintain a low rotation speed of the cylinder, which in turn leads to the read-out of the phosphor sheet being slow.

An object of the present invention is therefore to provide a method and apparatus wherein the phosphor sheet is, in a manner known per se, moved during its read-out, but wherein the phosphor sheet, in spite of this movement, can be maintained precisely in the required shape. This means that the distance between the read-out apparatus, which includes a source of stimulating light and a detector for emitted radiation, and the phosphor sheet will not change but will remain as precisely as possible at what it is intended to be in each given case. Thus an object of the invention is a method and apparatus in which the phosphor sheet can be read out at a high speed without there being a risk of any change in the mutual positioning of the phosphor sheet and the read-out apparatus. Another object of the invention is a method and apparatus of this type, wherein the risk of the phosphor sheet being dislodged when it is being moved during the read-out is minimal. A third object of the invention is an apparatus and method of this type, wherein the idle time during the read-out, i.e. the time which is not used for effective read-out of the phosphor sheet, is as short. as possible, or alternatively the read-out speed is so high that the idle time has no practical significance. A fourth object of the invention is a method and apparatus of this type, enabling phosphor sheets of considerably different sizes to be simply positioned and read out. A fifth object of the invention is a method and apparatus of this type, enabling conventional and separate phosphor sheets, i.e. phosphor sheets without special devices, to be used. A sixth object of the invention is a method and apparatus of this type, in which small-sized and efficient light collectors can be used. A further object of the invention is a method and apparatus of this type, by means of which a maximally high read-out precision can be achieved, in which case the pixel size is as small as possible and the apparatus is capable of reading out as high a number of line pairs per one millimeter as possible. One further object of the invention is a method and apparatus of this type, making an easy-to-use and economical apparatus and its use possible.

The disadvantages described above can be eliminated and the objects defined above can be achieved by using the method according to the invention, and an apparatus according to the invention.

The most important advantage of the invention is that, through the use of the method and apparatus according to it, a conventional, relatively flexible phosphor sheet can be caused to remain in precisely the desired shape and in particular in the shape of a circular cylinder, without any specific fastening devices. Another advantage of the invention is that the phosphor sheet may be of any conventional type and it can be caused to remain with high precision in a cylindrical shape and to remain very firmly in place, in which case the distance between the read-out means and the phosphor surface can be set at as low a value as possible and their mutual positioning can be controlled with precision. Thereby a high efficiency in the collection of emitted light into the collector and a small size of the stimulating beam and its precise aiming at the phosphor sheet are accomplished. Furthermore, a high read-out speed is accomplished. Thus, by using the method and apparatus according to the invention, it is possible to arrive normally and with relative ease at a pixel size of 100*100 $\mu$m even when the radiograph size is large (e.g. 24 cm*30 cm). In practice, with moderate care, a pixel size of 70*70 $\mu$m or even a pixel size of 50*50 $\mu$m can be accomplished in this radiograph size. Theoretically the achievable pixel size is in the order of 20 $\mu$m*20 $\mu$m, which is better than the value achieved by using any other read-out method or read-out apparatus. In fact, the only factor limiting the read-out precision in the arrangement according to the invention is the precision at which the phosphor sheet is capable of recording a latent image. One further advantage of the invention is the high read-out speed; a large image of the size mentioned above can be read out at least in a time less than 2 minutes, or usually in about 1 minute, or even in about ½ minute, whereas the time taken by read-out in known methods and apparatuses is many times this. In fact, the only factor limiting the read-out speed in the arrangement according to the invention is the frequency at which the detector is capable of detecting changes in radiation and/or the speed at which the phosphor sheet is capable of starting and ending its stimulated emission. One more advantage of the invention is that it is possible to use small-sized and efficient light collectors, in which case the emitted light can be directed to the detector at best almost entirely, with very small losses.

The invention is described below in detail, with reference to the accompanying figures.

FIG. 2A depicts a top view of the principal features of a second embodiment of the apparatus according to the invention, as seen from direction IV in FIG. 2B and partly as a cutaway, the section being through IX—IX in FIG. 2B, with a phosphor sheet partly pushed into the drum member.

FIG. 2B depicts a cross-section of the apparatus of FIG. 2A, through V—V, which is perpendicular to the rotation axis, with a phosphor sheet shown in its place.

FIG. 3A depicts a top view of the principal features of a third embodiment of the apparatus according to the invention, as seen from direction VI in FIG. 3B and partly as a cutaway, the section being through VII—VII in FIG. 3B, with a phosphor sheet partly pushed from the outside to the inside or partly pulled out of the drum member.

FIG. 3B depicts a cross-section of the apparatus according to FIG. 3A, through VIII—VIII, which is perpendicular to the rotation axis, with a phosphor sheet partly pushed into or partly pulled out of the drum member.

Figure 1B:
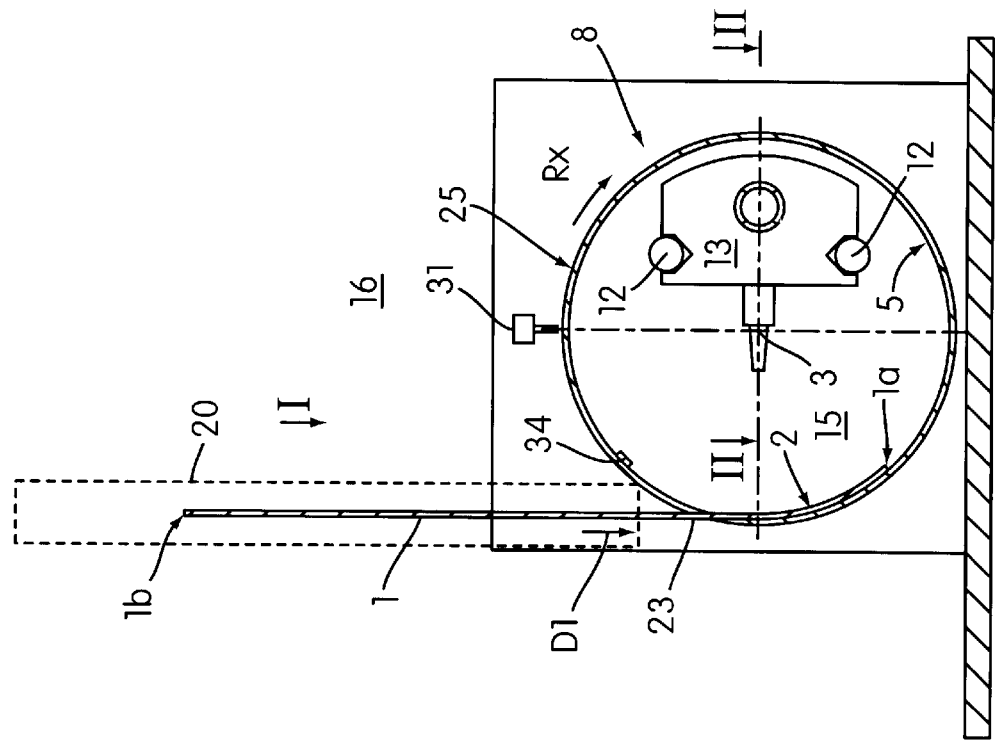
FIG. 1B depicts a cross-section of the apparatus of FIG. 1A, through III—III, which is perpendicular to the rotation axis, with a phosphor sheet partly pushed inside the drum member.

The present invention for the read-out of a phosphor sheet does not relate to the exposure of the phosphor sheet with X-rays in order to record a latent image therein but to the read-out of a latent image recorded in a phosphor sheet in any suitable manner, after its exposure. However, it should be pointed out that in general a phosphor sheet is exposed while it is positioned in some suitable radiography cassette, in which the phosphor sheet in general remains as precisely as possible flat. For the read-out, the phosphor sheet is taken out of the cassette. It is also possible to expose the phosphor sheet with X-rays while it is in some curved shape, but this curved shape has no relation to the curved shape during the phosphor sheet read-out described below. The point of departure in the invention is thus that the phosphor sheet is separate (i.e. not attached to a rigid or corresponding backing), in which case it can be handled and positioned into the required shape, and it also already carries the latent image information.

The figures show a drum member 8 of a solid and rigid material, having on its inside a cylindrical circumferential surface 5 formed by a cylindrical cavity 15. The drum member 8 is attached, for example, with bearings at one end, at point 26, so that the drum 8 can be rotated around the axis 3 of the cylinder circumference 5. Preferably this inner cylindrical surface 5 is a circular cylinder, and usually the opposite outer surface 25 of the drum member 8 is also cylindrical, in which case the entire drum member 8 is a tubular piece. With this design, the drum member 8 can be easily balanced so that its rotation around the axis 3 of the circumferential surface 5 is as steady as possible. When necessary, the impacts of the apertures of the drum member and of the weight of the phosphor sheet can be compensated for by using fixed or detachable or relocatable balancing means. This drum member 8 is rotated by a motor 22, the axle of which is attached at the axis 3 of the circumferential surface 5 of the drum member. However, there is no obstacle to rotating the drum member 8 in some other way, for example, on top of rollers, but the embodiment shown in the figures is most likely the most preferable, since by using it the circumferential surface 5 can be well centered and the rotation of the drum will be steady. The drum member 8 may be made from a metal, such as aluminum, or any strong and rigid plastic, or-any suitable strong and rigid composite material.

The phosphor sheet 1, into which a radiation image has been recorded, usually by X-ray radiation, by any known or new method, which method is thus not shown in the figures and is not even otherwise described here, is placed according to the invention against the concave inner circumferential surface 5 of the cylindrical cavity 15 of this drum member 8 in such a manner that the stimulable phosphor surface 2 carrying a latent image will be the concave side and will thus face the axis 3. The phosphor sheet 1 may be introduced against the concave shape of the cylindrical circumference 5 in a number of ways, which are described in greater detail below.

Figure 1A:
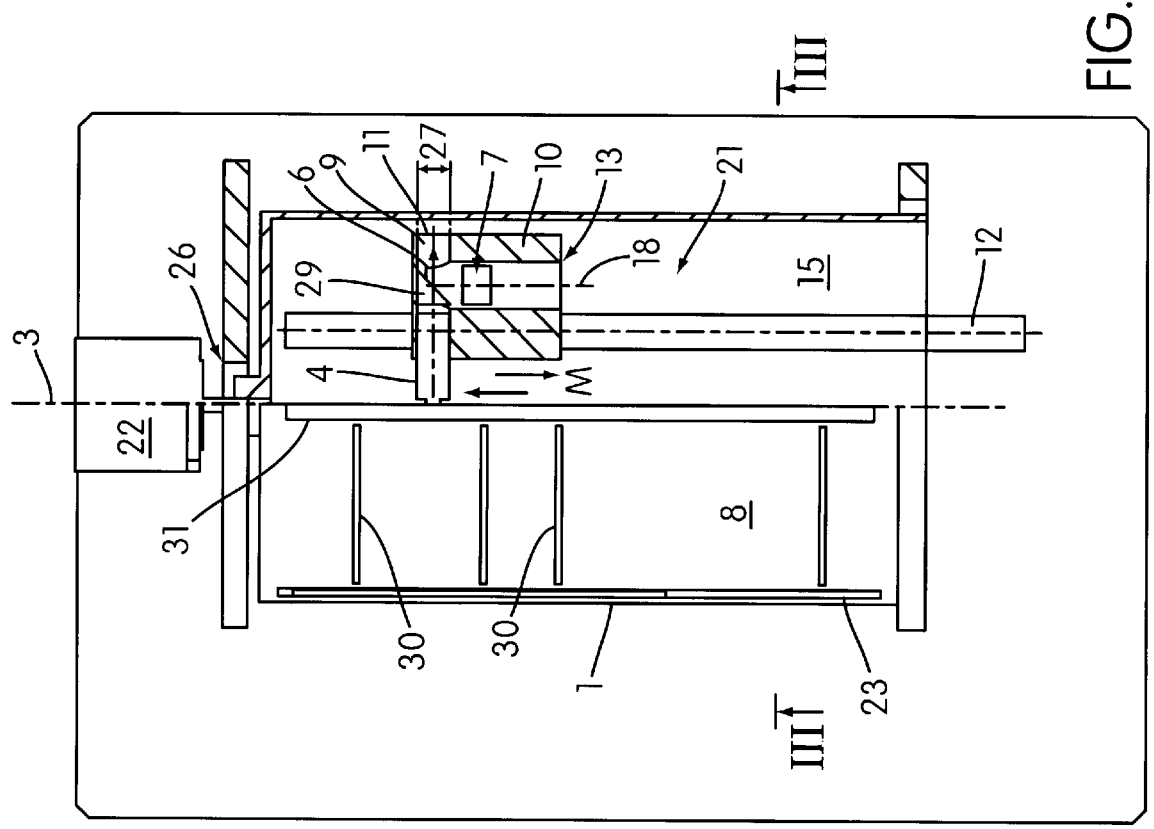
FIG. 1A depicts a top view of the principal features of a first embodiment of the apparatus according to the invention, partly as a cutaway in such a way that the left side of the figure depicts a top view of the apparatus from direction I in FIG. 1B and the right side of the figure depicts a section through II—II in FIG. 1B.

FIGS. 1A and 1B depict one preferred method according to the invention for implementing this. In this arrangement, there is on the circumference of the drum member 8 a straight slot 23 parallel to the axis 3, which slot may be relatively spacious or very narrow in the direction parallel to the circumference 5. In the latter case the slot is typically parallel to a tangent to the surface of the cylinder circumference 5. After radiography, the exposed phosphor sheet 1 is normally in a cassette 20, which is shown only schematically in the figures. From the cassette 20 the phosphor sheet 1 is pushed, with its leading edge 1*a* first, by tools not shown in the figures via the slot 23, in a direction D1 parallel or approximately parallel to a tangent to the cylinder circumference 5, into the cylinder cavity 15 inside the drum member 8, in particular along its inner surface 5. The direction of the push may in principle deviate considerably from the said tangential direction, for example 10°, 20° or 30° therefrom, but this will probably complicate the structure. FIG. 1B shows a situation in which part of a phosphor sheet 1 has been pushed into the shape of the cylinder circumference 5, and part of it is still in the cassette 20. For read-out, the entire phosphor sheet 1 is pushed to the inside of the cylinder cavity 15 into the shape of the cylinder circumference 5, which is evident when the pushing is continued in direction D1 in the case of FIG. 1B, until also the trailing edge 1*b* of the phosphor sheet 1 is inside the cylinder cavity 15, against the cylinder circumference 5. The leading edge 1*a* of the phosphor sheet 1 is pushed, for example by means of a transfer member 31 extending to the inside of the drum via slots 30 parallel to the circumference, the transfer member being in this case in contact with the trailing edge 1*b*, until the leading edge meets a limiter 34 on the cylinder circumference 5. At this time the phosphor sheet 1 is thus in its entirety along the cylinder circumference 5 formed by the cylinder cavity 15, in such a manner that the stimulable phosphor surface 2 is inwards, facing the axis 3, and forms the concave side of the phosphor sheet. After the read-out of the phosphor sheet 1, the phosphor sheet can be removed from the inside of the drum member 8 by pushing the member 31 to the inside of the drum via the slots 30 parallel to the circumference and by pushing at the leading edge 1*a* in a direction opposite to the pushing-in direction D1, whereupon the phosphor sheet leaves via the slot 23, the trailing edge 1*b* first. This removal is thus simply an operation reverse to the pushing of the phosphor sheet into the cylinder cavity 15.

FIGS. 2A and 2B depict a second procedure for bringing a phosphor sheet against the concave cylinder circumference 5 of the cylinder cavity 15. Therein the phosphor sheet is in advance bent into a cylindrical shape, for example by means of a ring 24 having a diameter slightly smaller than that inside diameter of the cylinder cavity which forms the cylinder circumference 5. Thereupon this phosphor sheet 1, bent into a substantially cylindrical shape, can be pushed in a direction D2 approximately parallel to the axis 3, via the open end 19 of the drum member 8, with the first side edge 1*c* first, into the cylinder cavity 15 of the drum member, and further against its circumference 5. In this case, also, the phosphor sheet is positioned so that its stimulable phosphor surface 2 carrying a latent image will be inwards, facing the axis 3, thus forming a concave surface. In this case the phosphor sheet 1 can be removed from the cylinder cavity by using a member 33, which extends via slots 32 parallel to the axis 3 into the cylinder cavity, the member gripping the first side edge 1*c* of the phosphor sheet and pushing the phosphor sheet in the direction opposite to the pushing-in direction D2, the other side edge. 1*d* first, out of the cylinder cavity 15. In this case, also, the removal is an operation completely reverse to the pushing in of the phosphor sheet.

FIGS. 3A and 3B depict a third procedure for introducing a phosphor sheet 1 into the cylinder cavity 15. This procedure resembles that shown in FIGS. 1A and 1B, except that in this one the phosphor sheet is not introduced from a cassette but is guided by means of rolls 28 via a slot 23 parallel to the axis along the shape of the cylinder periphery 5, just as in the case of FIGS. 1A and 1B. In the present case the removal of the phosphor sheet 1 is carried out, as in FIGS. 1A and 1B, by using a member 31 pushing into the cavity or chamber 15 via slots 30 parallel to the circumference. In the figures, members 31 and 33 are, for the sake of clarity, shown as separate from the drum member 8, as they will be in a situation in which they are not being used. It is evident that they can be placed in the operating position by moving them in a direction parallel to the radius of the cylinder circumference 5, towards the axis 3.

Procedures have been described above in which the phosphor sheet is, after the read-out, removed from the inside of the drum member 8 by using the same members as were used for introducing them. It is, however, possible to remove the phosphor sheet for re-use from the cylinder cavity 15 in any other manner. For example, if the phosphor sheet has been brought onto the cylinder surface 5 by the procedure of FIGS. 1A–B, it can be removed by procedures shown either in FIGS. 2A–B or in FIGS. 3A–B, and respectively the removal of a phosphor sheet introduced by the procedure shown in FIGS. 2A–B can be carried out by the removal procedure shown in FIGS. 3A–B, or by any other procedure. The procedure for introducing a phosphor sheet onto the cylinder surface 5 for read-out and the procedure for its removal after the read-out may be procedures completely independent of one another. It is clear that numerous arrangements different in their details can be designed for the introduction and removal of the phosphor sheet.

According to a preferred embodiment of the invention, a phosphor sheet 1, positioned in the cylinder cavity, will be caused to settle precisely in the shape of a circle, i.e. the shape of the cylinder circumference 5, by rotating the drum member 8 around the axis 3 at a sufficiently high circumferential speed Rx, which will produce a sufficient centrifugal force which will press the phosphor sheet 1 outwards in the radial direction of the cylinder circumference 5, and thus precisely against the said concave inner surface 5 of the cylinder. This required circular velocity will, of course, depend on the rigidity and mass of the phosphor sheet 1, and according to the invention it is indeed most preferable to use a phosphor sheet 1 which is as flexible as possible. If the diameter of the concave cylinder circumference S is in the order of 15 cm–20 cm, and if conventional commercially available phosphor sheets are used, the rotation speed required for producing a sufficient centrifugal force is at its minimum in the order of 500 rpm, but most phosphor sheets can be caused to settle against the surface 5 by using a rotation speed of 1000 rpm; it is most preferable to use rotation speeds of 1500–2000 rpm, whereby any commercial phosphor sheets which have not specifically been stiffened can be caused to settle and to remain very precisely in the shape of the cylinder circumference 5. In this case the magnitude of the centrifugal force corresponds to an acceleration of 300 $g_n$ for the mass of the phosphor sheet. When especially flexible phosphor sheets are used, a sufficient precision of shape can be accomplished at an acceleration of 100 $g_n$, or possibly even at an acceleration of 30 $g_n$, for the mass of the phosphor sheet ($g_n$ stands for an acceleration of the magnitude of the earth's gravitational pull). As is evident, it is also preferable to use not only a phosphor sheet as flexible as possible, but at the same time as heavy as possible, because in such a case a precise contact between the phosphor sheet and the inner surface of the cavity of the drum member can be accomplished using even a low rotation speed. Aiming at a low rotation speed, however, is not significant, since the scanning of the drum member, and thus of the cylindrical phosphor sheet rotating with it, takes place during this very rotation, and for a rapid read-out of the phosphor sheet it is expedient to use as high a rotation speed as possible. Thus the rotation speed and the circular velocity Rx are limited in the arrangement according to the invention only by the speed of the phosphor sheet and the detector, as well as of the electronics associated therewith, and the strength of the apparatus. A maximally high circumferential speed also best ensures that the phosphor sheet will remain precisely against the circumferential surface 5, i.e. in the correct shape. The flexible material of which the phosphor sheet is made is, of course, a solid material, and typically also a resilient material, in order that the phosphor sheet should recover its original straight shape after the read-out.

By using the above-described inner cylinder circumference 5 and method for introducing a phosphor sheet 1 against its inner surface and a sufficient rotation speed of the drum member, i.e. circumferential speed Rx, one and the same apparatus can be used for the read-out of phosphor sheets of considerably different sizes without there being the need to adjust the fastening of the phosphor sheets in any way according to the phosphor sheet size. Thus such an apparatus can be used for the read-out of phosphor sheets as large as 24 cm*30 cm, or phosphor sheets as small as 30 mm*40 mm, since the centrifugal force will hold the phosphor sheet in the correct shape. The purpose of the limiter 34 is only to ensure that the phosphor sheet will not move in the circumferential direction of the surface 5 during the read-out. The drum member according to the invention may have a plurality of longitudinal slots 23 for the introduction of phosphor sheets against the cylinder circumference 5. The drum member may also comprise more than one limiter on its circumferential surface 5, which limiters may be fixed or detachable. By these arrangements it is possible, when necessary, to arrange on the circumferential surface 5 simultaneously several phosphor sheets smaller than the maximum size for being read out in one scanning. When a maximum-sized phosphor sheet is placed inside the drum member, it will thus cover nearly 360° of the circumference of the circumferential surface, whereas smaller phosphor sheets will cover a smaller proportion of this circumference. Drum members of different sizes may be arranged in the apparatus according to the invention, according to the size of the phosphor sheets to be scanned.

Figure 4:
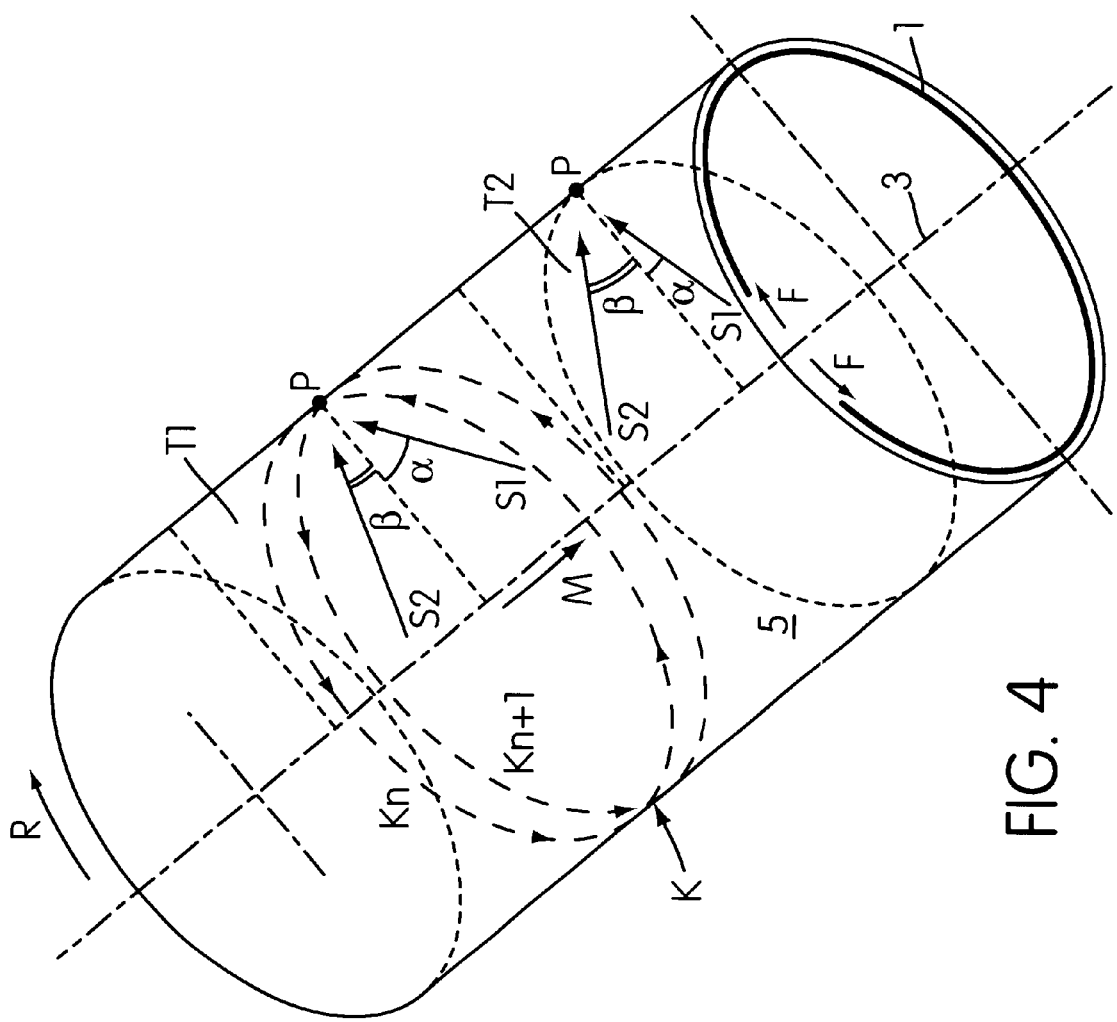
FIG. 4 depicts schematically a phosphor sheet bent into a cylindrical shape and, inside the cylindrical shape, the directions of the stimulating beam and the sensitivity directions of the detector for emitted light, as well as the scanning trace formed in the read-out of the phosphor sheet, with a phosphor sheet in its place in a cylindrical shape inside the drum member.

Another option for pressing a phosphor sheet 1 against the concave circumferential surface is compression F—F parallel to the circumference; this force is indicated in principle in FIG. 4. The control of the compressive force F is, however, difficult. A third option is to generate a vacuum between the phosphor sheet 1 and the inner circumferential surface 5 of the drum member, this vacuum sucking the phosphor sheet fast against this surface. This option, for its part, requires expensive and complicated additional devices. Therefore the most preferred option of the invention is to use a sufficiently high circumferential speed Rx of the rotation of the drum member 8, as described above.

The apparatus of the invention includes read-out devices, described below in greater detail, for the read-out by scanning of a phosphor sheet positioned in the manner described above, in which the phosphor surface 2 carrying a latent image forms the concave side and preferably a circular cylinder, which is rotated around its axis 3. The read-out of the phosphor sheet is started after it has been brought, by any of the procedures described above, against the cylinder surface 5 and has been pressed, for example under the centrifugal force described above, with precision of shape against a surface having preferably the shape of a circular cylinder. The read-out means comprise a transfer member 21 for aiming stimulating light from a light source 4 at the phosphor surface 2 of the phosphor sheet in a direction S1 which is away from the axis 3. The read-out means also comprise a photodetector 7 for detecting light emitted form the phosphor surface under the effect of stimulation, the main direction of the emitted light being thus from the cylinder circumference 5 towards the center. The figures depict preferred embodiments of the invention for accomplishing this. In all of these embodiments, the transfer members 21 are mechanical members which extend to the inside of the said cylinder cavity 15 and carry means for transmitting a stimulating beam 6 and a detector for detecting radiation emitted from the phosphor surface. In this case also the light source 4 and the photodetector 7 are located inside the cylinder cavity, at least in part and for at least a large proportion of the read-out time of the phosphor sheet. However, there is no obstacle to the arranging of a transfer member structure in which either the source 4 of stimulating light and/or the photodetector 7 receiving the light emitted from the phosphor surface are/is located outside the cylinder cavity. In such a case the transfer members would possibly comprise only members for transferring optical transmission components or for turning them in a direction M parallel to the axis 3 for the read-out of the phosphor sheet. It is necessary to move the read-out means in direction M only over the distance over which the phosphor sheet or phosphor sheets cover the cylinder circumference 5 in a direction parallel to the axis 3.

FIGS. 1A–3B depict structures in which there are, inside the drum member 8, guides 12, such as guide bars, parallel to the axis, and a slide 13 moving in the axial direction along these guides, the slide carrying a source 4 of stimulating light and a detector 7 for emitted light. During the rotation Rx of the phosphor sheet, the slide is moved in a direction M parallel to the said axis 3 for the read-out of the phosphor sheet, trace by trace, which traces are made up of parts of a continuous spiral. For this purpose the direction S1 of the stimulating light beam 6 and the principal sensitivity direction S2 of the detector 7 for emitted light are in the slide in unchanging positions relative to each other, but their combination, i.e. the slide 13, is moved in direction M.

FIGS. 1A–1B depict an embodiment in which the light source 4 transmits a stimulating beam 6 directly towards the cylindrical phosphor surface 2, the stimulating beam 6 being parallel to a radius of the circumferential surface 5. The stimulating beam 6 travels via a light collector 9. The light emitted from the phosphor surface 2 is collected by the light collector 9, the first end 11 of which is as close as possible to the phosphor surface 2 and which is made up of an inwardly reflective member, such as a tubular part. The stimulating beam 6 meets the phosphor surface preferably within the area of this first end 11. The emitted light collected by the light collector 9 is deflected, for example, by means of a prism 29, from a direction which is on average from the phosphor surface 2 towards the axis 3 to a direction substantially parallel to the axis, to meet a detector positioned in the axial direction, in which case this emitted light is detected by detector 7 and is converted by it into an electronic form for further processing. When in FIGS. 1A–1B the phosphor sheet 1 is rotated at a steady circumferential speed Rx and the slide together with the light source 4 and detector 7 is moved at a steady speed M in a direction parallel to the axis 3, the concave phosphor surface of the phosphor sheet will be scanned one trace K at a time, as is evident and has been depicted schematically in FIG. 4.

FIGS. 2A–2B depict a slightly different arrangement, wherein the stimulating beam 6 transmitted by the light source 4 meets the phosphor surf ace 2 at a small angle, which angle is in a radial plane passing via the axis 3. The principal direction of sensitivity of the detector 7, for its part, is parallel to a radius of the circumferential surface 5. In other respects, also in this case these members have been arranged in such a manner relative to one another that the stimulating light beam 6 meets the phosphor surface 2 within the area of the first surface 11 of the light collector 9, preferably in the center of this area 11. The structure of this light collector 9 is in this embodiment, as in the embodiment described above, an inwardly reflective tubular part. In this case the stimulating beam will not impinge against any point in the side wall of the light collector 9.

FIGS. 3A–3B depict an embodiment which somewhat resembles the embodiment shown in FIGS. 2A–2B. In this, also, the principal sensitivity direction of the photodetector 7 is perpendicular to the phosphor surface 2, i.e. parallel to a radius of the circumferential surface 5. In this case, however, the light source 4 is in a position so much deviating from the perpendicular to the phosphor surface, and at a suitable distance from the end surface 11 of the light collector 9, that the stimulating beam 6 is reflected from one inwardly reflective surface 14 of the light collector 9 and impinges via it, via the first end 11, against the phosphor surface 2.

It is clear that in all of these three described embodiments, the light source 4 transmitting a stimulating light beam 6 and the light collector 9 with its detector 7 can be rotated around that perpendicular to the phosphor surface 2 which passes via the first end 11 of the light collector, into any position. Thus, for example, in the embodiments of FIGS. 2A–2B and 3A–3B, the light source 4 and the detector 7 are in the same plane passing through the axis 3. If the members are rotated, for example through 90°, they will be located relative to each other in other respects in the positions depicted in the figures but in a plane perpendicular to the axis 3, i.e. in a plane perpendicular to the image plane. If thus, for example in a situation corresponding to the case of FIG. 2A–2B, in which the light collector 9 and the detector 7, as well as the source 4 of stimulating light, are located in the same plane perpendicular to the axis 3, this configuration is raised somewhat above the horizontal plane passing through the axis 3, the stimulating beam will meet the phosphor surface 2 in a perpendicular direction (unlike the situation shown in FIG. 2A–2B), in which case the resolution is at its best.

This very high resolution made possible by the structure according to the invention and the very high efficiency in the collection of the light emitted from the phosphor surface are based, among other things, on the fact that the direction S1 of the stimulating light beam 6 is either perpendicular or at a very small angle $\alpha$ to the phosphor surface 2, and the radiation emitted from the phosphor surface 2 is collected, by a light collector 9 having a relatively small diameter 27, directly from around the meeting point P of the stimulating beam and the phosphor surface into the detector 7, the principal sensitivity direction S2 of which is also either perpendicular or at a small angle $\beta$ to the phosphor surface. This resolution and this luminous efficiency are further improved by the fact that the stimulating beam 6 and the light collector 9 are constantly in a fixed position relative to each other, regardless of the rotational movement Rx of the drum member 8 and the rectilinear movement M of the slide, and advantageously the stimulating beam 6 impinges against the phosphor surface 2 in the center of the light collector end 11. The efficiency of the collection of emitted light is further improved by the fact that this end 11 of the light collector, or the light collector 9 in general, or directly the-detector 7 can, by using the arrangement according to the invention, be located very close to the phosphor surface, since the phosphor sheet will be held well in shape by the procedure described above. In the invention the distance between these optical means and the phosphor surface is typically less than 10 mm or 5 mm, but the distance can easily be made to be less than 2 mm or even less than 1 mm. Distances of 0.5 mm and down to 0.1 mm are possible. The small distance makes it possible to use a small collector, in which case losses of light can easily be minimized. The purpose of FIG. 4 is to illustrate the orientations of the direction S1 of incidence of the stimulating beam 6 and the principal sensitivity direction S2 of the detector used for the read-out of the light emitted from the phosphor surface 2. FIG. 4 shows, first, schematically a plane T2, which is perpendicular to the cylinder axis 3, and the direction S1 of the stimulating beam 6 is at an angle α to a radius of the cylinder circumference 5, and the principal sensitivity direction of the detector 7 is at an angle β to the same radius. These directions S1 and S2 are thus incident upon one point P on the phosphor surface 2. Furthermore, FIG. 4 shows schematically a plane T1, which is a plane passing through the axis 3, in which plane the direction S1 of the stimulating beam is at angle α to a radius of the cylinder circumference 5 and the principal sensitivity direction S2 of the detector 7 is at an angle β to the same radius, in which case the directions S1 and S2 meet at the same point P, which is a point on the phosphor surface. It is clear that angles α and β may also form at positions other than those shown in FIG. 4, i.e. they may be in a plane other than a plane parallel to the axis 3 or perpendicular to it, or they may be in different planes relative to each other, but it is preferable if the directions S1 and S2 meet at the same point P on the phosphor surface 2. In order to accomplish a high resolution, both angle α and angle β are at maximum approx. 45°, and preferably they are smaller than approx. 30°. It is to be noted that when we speak about the directions S1 and S2, we mean directions in the area of the phosphor surface 2, and thus the radiation direction of the light source 4 may be any direction whatsoever, as long as by means of mirrors, prisms or other means it can be caused effectively to impinge against the phosphor surface 2 within the limits defined above. Likewise, the sensitivity direction of the detector may be any direction whatsoever, as long as by means of mirrors, prisms or other means it can be caused effectively to impinge against the phosphor surface 2 within the limits defined above. Thus, for example, in the arrangement of FIG. 1A the sensitivity of the detector 7 points in a direction parallel to the axis 3, but owing to the design of the light collector 9 its sensitivity direction in the area of the phosphor surface 2 is perpendicular to the phosphor sheet. The same applies to the light source 4 depicted in FIG. 3A, the original direction of radiation of which deviates from the targeted direction, but the beam reflected from the mirror surface 14 of the light collector fulfills the condition defined above in the area of the phosphor surface 2. There is no obstacle to the use of even larger angles of incidence, but in such a case the resolution and the light collection capacity are clearly lowered.

Since an individual phosphor sheet point is read out at point P and the slide, and thus the directions S1 and S2 of the arriving and leaving beams, will shift in direction M of the axis 3 while the phosphor surface moves in direction R, it is clear that the read-out point P will draw along the circumferential surface of the cylinder 5 a spiral line K, of which FIG. 4 shows two, i.e. $K_n$ and $K_{n+1}$, i.e. two successive scanning traces. It is clear that earlier, corresponding partial spirals of a spiral part $K_n$ extending around the circumferential surface 5 can be indicated by $K_{n-m}$ and any subsequent spiral line parts by $K_{n+m}$. The distance between these spiral lines, i.e. scanning traces, can be adjusted by joint adjustment of the circumferential speed Rx and the transfer speed M of the slide carrying the read-out means 4, 7. A resolution of 6–7 line pairs/mm, and also a resolution of 12 or more line pairs/mm, can easily be accomplished by means of the invention. The phosphor sheet read-out is implemented as a steady, continuous action, in which case neither the radiation source—detector combination not the drum member is stopped, nor is their direction changed; they are both maintained in as steady a motion as possible.

The light collector 9 is preferably a hollow chamber 17 in a solid material, such as metal, plastic or glass, the inner surface of the chamber being reflective of the light emitted from the phosphor surface. This light collector 9 may comprise a branch and/or any other wall portion transparent to stimulating radiation, as in FIGS. 2A and 3A, through which the stimulating beam 6 has access to the area of the first end 11 of the light collector. In addition, the light collector 9 may have mirrors or prisms, either for guiding the stimulating beam to the phosphor surface or for guiding to the detector 4 the radiation emitted from the phosphor surface. However, here the radiation source—detector combination is very simple in structure, since it does not require any parts movable relative to each other, as can be seen in the embodiments of the figures. In order to accomplish a high efficiency, the diameter of the light collector 9, i.e. in general the diameter 27 of its first end 11, is preferably at least three times the diameter of the sensitive area of the photodetector 7, the first end 11 being as close as possible to the phosphor surface 2. The light collector is preferably a tubular member having a circular or oval cross-section, and in many cases its diameter is at maximum approx. twice the diameter of the sensitive area of the photodetector 7, but the diameter 27 may also be approximately equal to the diameter of the sensitive area of the detector 7. It is also possible to use a collimator suitable for the purpose, in which case a light collector having a diameter 27 even greater than those mentioned above, for example a light collector five times that of the detector, can be used.

The light source 4 used is typically a laser of a suitable type, such as a semiconductor laser or, preferably, a laser diode. These are small in size and can be used continuously over long periods. In addition, the apparatus may comprise a radiation source providing steady light, not shown in the figures, by means of which the image is erased from the phosphor sheet after it has been read out.

The slide 13 carrying the source 4 for stimulating light and the photodetector 7 can be moved in direction M, which is parallel to the axis 3, by any mechanism known per se. One option is to shape one of the guides 12 as a toothed rack against the teeth of which a toothed gear is rotated by a motor in the slide. Another option is to provide, in the hollow chamber 15 or outside its ends, gears around which there is tightened a toothed belt to which the slide 13 is fastened. In this case, by the rotation of the gear or gears of the toothed belt, the slide can be caused to move in direction M along the guides 12. A third option is to arrange one of the guides 12 as a threaded bar rotating around its axis, and its counterpiece in the slide as a nut or the like, in which case the rotation of the bar will move the slide 13 in direction M. These structures are not shown in the figures in greater detail, since many different new or known structures can be applied to them in the manner described above. The guides 12 may be supported at both ends projecting out from the cavity 15 of the drum member 8, or at only one end. The drum member may also be supported by bearings at both ends or at only one end. If the procedure depicted in FIGS. 1A–1B and 3A–3B is used for feeding the phosphor sheet into the cavity 15 against the cylinder circumference 5 and out of it, the possibilities for other structural options are better. If the procedure depicted in FIGS. 2A–2B is used for feeding in the phosphor sheet and for taking it out, the structural options are limited, since the end 19 of the cavity 15 must be free.

In principle, of course, it is possible, while remaining within the scope of the invention, to keep the light source 4 and the photodetector 7 stationary and to produce a partial scanning movement in a direction M parallel to the axis 3 by moving the drum member also in the axial direction of the cylinder. However, this option will most likely lead to a complicated structure in which it will be difficult to accomplish a steady movement.

The read-out of a latent image recorded in a phosphor sheet by X-ray radiation has been discussed above. It is clear that the method and apparatus according to the invention can be used for all corresponding read-out functions regardless of the type of electromagnetic radiation or particle radiation by which the latent image has been produced. Likewise, the wavelength of the stimulating light can be any wavelength by means of which emission corresponding to the image can be obtained from a phosphor sheet. Thus the wavelength of the stimulating light, as well as the wavelength of the emitted light, may be outside the visible range. In the present application by term light is also meant corresponding radiation the wavelength of which is invisible to the human eye.

What is claimed is:

1. A method for the read-out of a latent image recorded in a stimulable phosphor sheet by X-ray radiation, in which method:

said separate phosphor sheet of a flexible material, which carries a latent image, is positioned in a curved shape in a cavity formed by a cylinder circumference having an axis; and with the stimulable phosphor surface as the concave side;

a stimulating light beam obtained from a light source is aimed at the phosphor surface of the sheet carrying the latent image in a direction pointing away from said axis, the light emitted from the phosphor surface under the effect of the light beam being directed to a photodetector;

moving a read-out means relative to the phosphor sheet for aiming the stimulating light beam and for detection of the emitted light with a transfer member which is moved in a rectilinear direction parallel to said axis; and rotating said curved phosphor sheet around said axis of the cylinder circumference formed by a drum member, at a sufficiently high predetermined circular speed so as to cause said curved phosphor sheet to settle against the circumferential surface which has the shape of a straight circular cylinder, and the stimulating light beam and the light collector moving at the same time in said rectilinear direction inside the straight circular cylinder so as to scan through a read-out point, the curved phosphor sheet in traces which form a spiral or parts of a spiral.

2. A method according to claim 1, wherein from the phosphor surface the light is emitted in a direction pointing towards the axis, and it is collected into the photodetector in this direction.

3. A method according to claim 1, wherein the phosphor sheet is positioned into the shape of the cylinder circumference, with the stimulable phosphor surface as the concave side, by pushing it, substantially in a direction parallel to a tangent to the cylinder circumference, to the inside of the cylinder circumference.

4. A method according to claim 1, wherein the phosphor sheet is positioned into the shape of the cylinder circumference, with the stimulable phosphor surface as the concave side, by pushing it, substantially in a direction parallel to the axis of the cylinder circumference, to the inside of the cylinder circumference.

5. A method according to claim 3 or 4, wherein the phosphor sheet is caused to settle precisely against said inner surface of the chamber formed by the cylinder circumference:

by a circumferential pressure acting between the ends of the phosphor sheet; or by a vacuum between the said inner surface of the cylinder circumference and the phosphor sheet.

6. A method according to claim 5, wherein said predetermined circular speed is at least 500 rpm.

7. A method according to claim 1, wherein the light emitted from the phosphor surface is collected by a light collector, which is made up of a hollow chamber in a solid material, the chamber having an inner surface which reflects the emitted light and a first end the dimensions of which in the orientation of the phosphor surface of the phosphor sheet are substantially smaller than the dimensions of the phosphor sheet; that the distance between this first end and the phosphor surface of the phosphor sheet is less than 10 mm; and that the light collector will guide the collected light to the photodetector its other end.

8. A method according to claim 7, wherein the stimulating light beam is guided to meet the phosphor surface of the phosphor sheet substantially in the center of the first end of the light collector, and that during the read-out of the phosphor sheet the stimulating light beam remains in a fixed position relative to the light collector.

9. A method of claim 5, wherein said predetermined circular speed is between 1500 to 2000 rpm.

10. An apparatus for the read-out of a latent image recorded in a stimulable phosphor sheet by X-ray radiation, the apparatus comprising:

a cylinder cavity being formed by a drum member which has a concave circumferential inner surface for receiving a stimulable phosphor sheet having a phosphor surface for carrying a latent image;

a light source for aiming stimulating light at the phosphor surface of the stimulable phosphor sheet;

a photodetector for detecting the light emitted from the phosphor surface under the effect of stimulation, the apparatus further comprising:

a motor means for rotating the drum member having the inserted stimulable phosphor sheet around the axis of the circumferential inner surface at a predetermined circular speed to press the stimulable phosphor sheet against the concave circumferential inner surface; and transfer members for moving, relative to the stimulable phosphor sheet, a read-out point of the stimulating light beam and the emitted light in a rectilinear direction parallel to the said rotating axis, which the transfer members extend to the inside of said cylinder cavity of the drum member in order to introduce the stimulating light and to aim it at the concave phosphor surface of the phosphor sheet and to collect in the photodetector, the light emitted therefrom.

11. An apparatus according to claim 10, wherein said motor means rotates the drum member at a circumferential speed which corresponds in magnitude to 30 $g_n$–300 $g_n$, the mass of the phosphor sheet, to press the phosphor sheet precisely against the concave inner surface.

12. An apparatus according to claim 10, wherein the drum member further comprises a slot parallel to the axis, in the circumferential surface, for pushing a phosphor sheet in a direction, one edge first, from the outside of the drum member against the concave inner circumferential surface for the read-out of the phosphor sheet, and means parallel to the circumferential surface for removing the scanned phosphor sheet via said slot to the outside of the drum member.

13. An apparatus according to claim 10, further comprising an auxiliary member for bending the phosphor sheet into a smaller curvature than the radius of the concave inner surface of the drum member, in order to introduce the phosphor sheet, by a push parallel to the axis, from an open end of the drum member against its concave inner surface for the read-out of the phosphor sheet, and that the drum member comprises members parallel to the axis for removing the scanned phosphor sheet through the open end to the outside of the drum member.

14. An apparatus according to claim 10, the apparatus comprises inside the drum member, guides parallel to the axis and a slide moving along these guides in the axial direction, the slide carrying the light source of stimulating light and the photodetector for the emitted light, the slide being movable, during the rotation of the drum member and the phosphor sheet against its concave inner surface, in a direction parallel to said axis for the scanning of the phosphor sheet trace by trace which traces are made up of parts of a continuous spiral.

15. An apparatus according to claim 14, wherein in said slide, the direction of the stimulating light and the direction of the principal sensitivity of the photodetector for the emitted light are in fixed orientations relative to each other, in which case the phosphor sheet scanning traces are produced under the joint effect of the rotation of the drum member at a steady speed and the axial movement of the slide at a steady speed, so as a continuous spiral scanning line is formed in the area of the circumferential surface.

16. An apparatus according to claim 14 or 15 wherein the apparatus comprises in the slides a light collector, which is made up of a hollow chamber in a solid material, the inner surface of the chamber being reflective of emitted light, and its first end being proximate to the phosphor surface of the phosphor sheet and its second end carrying the photodetector aimed at the phosphor surface either directly or via a mirror, and that the light collector comprises a portion which is transparent to stimulating radiation; and the said stimulating light is aimed at the phosphor surface in the area of the first end of the light collector, or in the center of its first end.

17. An apparatus according to claim 14, wherein in that the movement of the slide in the axial direction is produced by at least one of the following:
- by at least one of the guide parts as a toothed rack engaging a toothed gear in the slide, or
- by the slide fastened to a toothed belt which runs around belt gears, or
- by a rotatable threaded bar parallel to the guide parts coupled to a nut part in the slide.

18. An apparatus according to claim 10, wherein the stimulating light is aimed substantially perpendicular at the phosphor surface of the phosphor sheet, or it is at an angle of at maximum 45° to the perpendicular to the phosphor surface, and that a light collector is a tubular member which has a circular or elliptical cross-section and the center line of which is effectively either directly or via a mirror or a prism substantially perpendicular to the phosphor surface or at an angle of at maximum 45° to the perpendicular to the phosphor surface, the diameter of the tubular member being at maximum five times the diameter of the sensitive area of the photodetector.

19. An apparatus according to claim 10, wherein the concave inner surface of the drum member is a straight circular cylinder, and that on the inner surface there is located at least one limiter parallel to the axis, for preventing circumferential shifting of the phosphor sheet during scanning.

* * * * *